United States Patent [19]
Torres

[11] Patent Number: 5,965,225
[45] Date of Patent: Oct. 12, 1999

[54] NOTE SHEET WITH PRESSURE-SENSITIVE ADHESIVE AND METHOD OF FABRICATION

[76] Inventor: Carlos A. Torres, 748 Blalock Rd., Houston, Tex. 77024

[21] Appl. No.: 08/932,416

[22] Filed: Sep. 17, 1997

[51] Int. Cl.$^6$ ........................................................ B32B 3/02
[52] U.S. Cl. ...................... 428/40.1; 24/67 R; 24/67 AR; 428/41.9; 428/42.1; 428/42.2; 428/42.3; 428/43; 428/194; 428/352
[58] Field of Search ................... 428/40.1, 41.9, 428/42.1, 42.2, 42.3, 43, 352, 194; 24/67 R, 67 AR

[56] References Cited

U.S. PATENT DOCUMENTS

| | | | |
|---|---|---|---|
| 3,884,443 | 5/1975 | McMaster | 428/352 |
| 4,416,392 | 11/1983 | Smith | 221/45 |
| 4,770,913 | 9/1988 | Yamamoto | 428/41.9 |
| 4,895,746 | 1/1990 | Mertens | 428/40.1 |
| 5,098,786 | 3/1992 | Hanke | 428/194 |
| 5,202,169 | 4/1993 | Spendlove | 428/194 |
| 5,366,776 | 11/1994 | Mertens | 428/40.1 |
| 5,622,761 | 4/1997 | Cole . | |

*Primary Examiner*—Nasser Ahmad
*Attorney, Agent, or Firm*—Browning Bushman

[57] ABSTRACT

A sheet of paper is provided with pressure-sensitive adhesive on areas of its front and rear surfaces. In a preferred form, the sheet is provided as a pad of similar sheets that may be removed from the pad one sheet at a time. The adhesive on the rear of the sheet is employed to secure the sheet to a first object. The adhesive on the front of the sheet is employed to secure a second object to the sheet. An area of the sheet face free of adhesive may be employed for a written message. A modified sheet is provided with cuts formed in an adhesive area of the sheet so that the cut area of the paper may move away from the plane of the sheet to adhere to irregular surfaces. The cut sheet may have adhesive on one or both sides. Where the adhesive is applied to both sheet sides, pressure-sensitive adhesive on the back of the uncut side of the sheet is used for adhering the sheet to a smooth surface. One modification of the pad configuration provides individual sheets folded so that the adhesive on the sheet is covered by an adhesive-free portion of the sheet so that no adhesive is exposed on the top of the pad. In manufacturing a pad of sheets in which the top sheet has no exposed adhesive, an elongated strip of paper has adhesive applied to both sides of the strip at spaced adhesive locations on the strip. The strip is folded in an accordion fashion to provide alternating folds with no adhesive and folds with adhesive. The pad is cut to provide one or more pads of individual sheets, each folded upon itself. The adhesive in each sheet adheres to the underlying sheet to hold the sheets together in the pad.

9 Claims, 2 Drawing Sheets

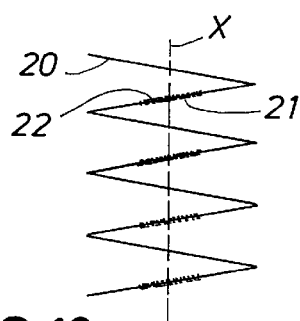
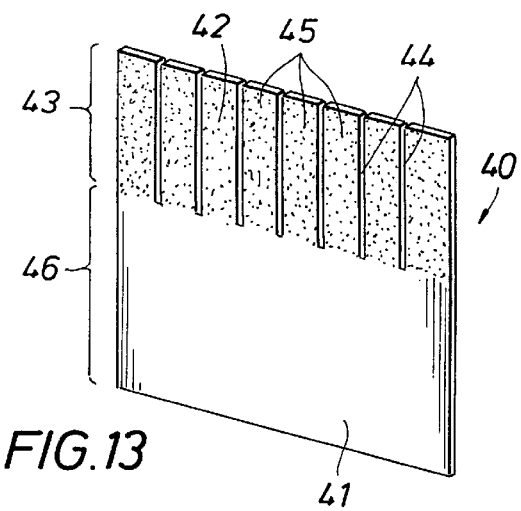
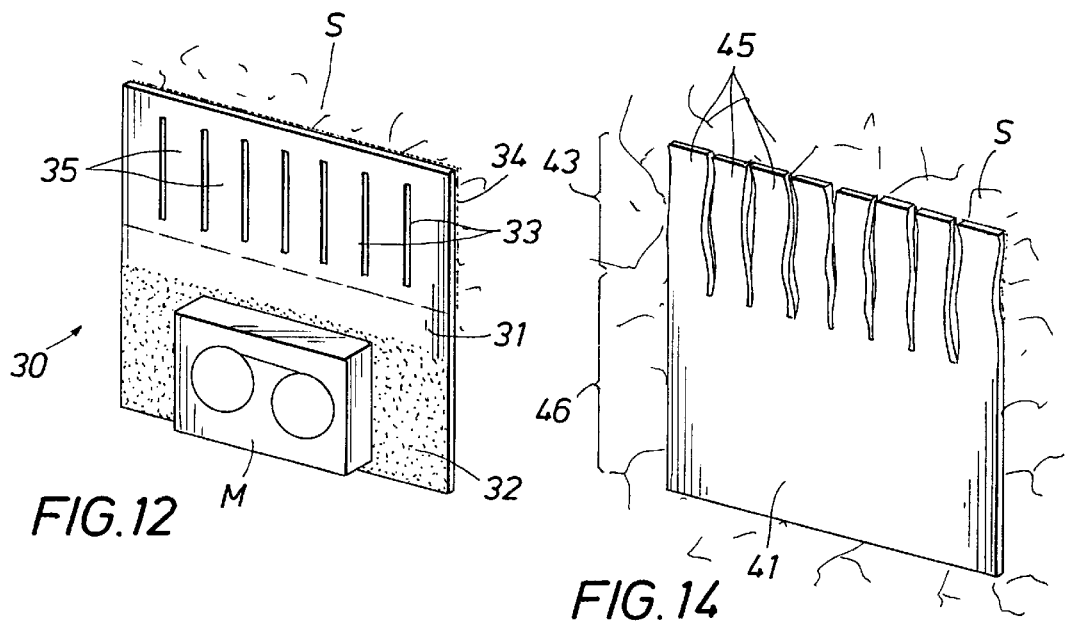
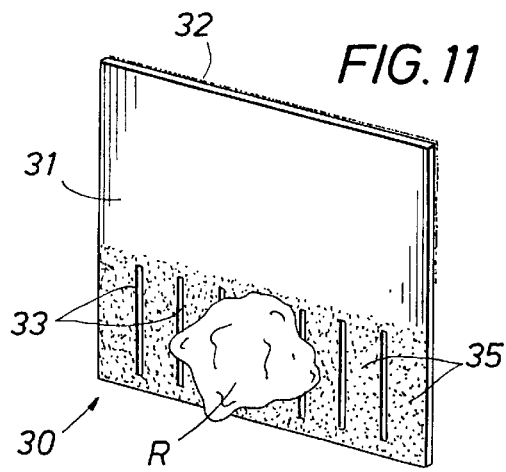
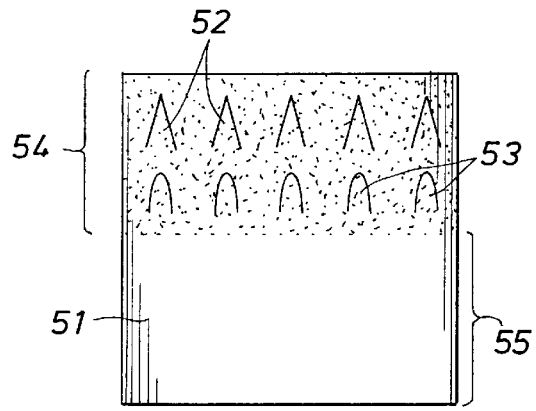

NOTE SHEET WITH PRESSURE-SENSITIVE ADHESIVE AND METHOD OF FABRICATION

BACKGROUND OF THE INVENTION

Note pads having pressure-sensitive adhesive applied to the rear surfaces of the individual sheets comprising the pad are well known. These sheets, which are removed from the pad one sheet at a time, are temporarily adhered to an object by the adhesive on the sheet to be employed for memorandums or messages or to mark book pages or other materials. In business and legal office practice, it is common to use these sheets to identify the subject matter of a dictated microcassette that is being sent to a typist for transcription. Typically, a file or other document is associated with the microcassette, and it is desirable to keep the document and the cassette together for the benefit of the typist. It is common to use a rubber band, metal clip, or other mechanical securing device to keep the microcassette and the document together with the note sheet.

Another situation that requires the use of mechanical securing devices with a note sheet occurs when it is desired to associate a note sheet with a small object, such as a key. If the object and the note sheet are to be displayed in a prominent area or an otherwise desired posting place, a means is needed to secure both the object and the note sheet to the desired posting location. This will usually entail the use of a fastener, such as cellophane tape, a thumbtack, or some other mechanical device that secures the note sheet and the small object to the desired posting place.

Problems may also be encountered in attaching the note sheet, either alone or with a small object, to an irregular posting surface or in attaching an irregularly shaped object to a smooth posting surface. Attaching conventional note sheets having pressure-sensitive adhesive to irregular surfaces can be difficult because of the limited surface contact between the irregular surface and the adhesive areas of the sheet. Additionally, forcing the adhesive area on the sheet to adhere to the irregular surface can distort the note sheet, making the message area wrinkled and difficult to read or access.

BRIEF SUMMARY OF THE INVENTION

In one preferred form of the invention, adhesive provided on the front and back of a paper note sheet secures the back of the sheet to an object and secures an object to the front of the sheet. An adhesive-free space provided on the front of the sheet receives markings such as a short note. The sheet is dispensed from a pad of sheets.

The note sheets of the pad in one form of the invention are folded upon themselves to prevent adhesive from being exposed on the top sheet of the pad.

In a modification of the invention, the adhesive-containing area at one end of the sheet is cut to form strips or tabs that are free to move away from the plane of the uncut area of the sheet to better adhere to an irregular surface or object. The uncut area on the reverse side of the opposite end of the sheet is provided with adhesive for preferential contact with a smooth surface. If the supporting or posting surface for the sheet is smooth, the uncut portion of the sheet is applied to the support surface. If the surface of the support is irregular, the strips or tabs of the cut portion of the adhesive area are applied to the support surface. In either situation, the cut adhesive section may be preferentially applied to the supporting or to the supported object, depending upon the extent of the surface regularity of the two objects. A modification of this form of the invention includes a sheet in which cuts formed in the adhesive area extend through the sheet edge so that the strips or tabs have a free end.

A preferred method of manufacturing one form of the invention comprises the steps of applying adhesive to the front and back of a strip of paper at spaced locations along the length of the strip. The strip is folded in layers, accordion-style, with one layer free of adhesive and the adjacent layer having adhesive on its front and rear sides. The fold side of the resulting pad of layered folds, adjacent the adhesive area, is cut away to separate the sheets into individual folded sections. The sections are held together by the adhesive in the folds to retain the separated sheets in the pad. No adhesive remains exposed at the top of the pad. Two pads may be fabricated by folding the strip such that the adhesive is in the center area of a fold and then cutting the pad in two along the center area.

Where the sheet is intended to be used to support physical objects, a larger percentage of the sheet will carry adhesive, both to better adhere to the supporting medium, as well as to better hold the supported object. As much as 20% or more of one or both sides of the sheet may be provided with adhesive for these applications.

From the foregoing, it will be appreciated that a primary object of the present invention is to provide a sheet of note paper that can secure two objects together.

Another object of the present invention is to provide note paper sheets in a pad with the individual sheets being removable from the pad to be used for securing two objects together and for providing space for a written message.

It is also an object of the present invention to provide a method for manufacturing a pad of note paper sheets in which adhesive is applied to both sides of each sheet of the pad.

Another object of the invention is to provide a pad of double-sided adhesive paper sheets in which the paper sheet at the top of the pad has no exposed adhesive.

Yet another object of the present invention is to provide a sheet of double-sided adhesive paper that may be posted on a first object, a message written upon the front of the sheet, and the sheet folded upon itself to adhere to the exposed adhesive on the paper surface to cover the message and the exposed adhesive.

Yet another object of the present invention is to provide a sheet of note paper having a pressure-sensitive adhesive applied to one or more areas of the sheet with cut sections provided in one of the adhesive areas whereby the cut area of the sheet forms strips or tabs that may be made to better conform and adhere to an irregular surface.

Still another object of the present invention is to provide a note sheet that has strips cut to one edge of the sheet, with adhesive carried on the strips, to allow the sheet to be adhered to an irregular surface to increase the adhesive forces between the sheet and the irregular surface and to prevent the message area of the sheet from being distorted.

The foregoing, as well as other, objects, features, and advantages of the present invention, will be more fully explained and will be better understood and appreciated by reference to the following drawings, specification, and claims.

BRIEF DESCRIPTION OF THE DRAWINGS

FIG. 10 schematically illustrates a modified method for fabricating two rectangular solid pads of sheets of the present invention;

FIG. 11 is a plan view illustrating a modified form of a note sheet of the present invention in which one of the adhesive areas is cut to permit the sheet to adhere to irregular surfaces on a secured object while the sheet is secured to a smooth surface;

FIG. 12 is an elevation illustrating the form of the invention depicted in FIG. 10 being used to support a smooth surface object from an irregular surface;

FIG. 13 is an elevation of a modified form of the note sheet of the present invention in which cuts formed in the adhesive area of the paper extend to the paper edge;

FIG. 14 illustrates the sheet of FIG. 12 adhered to an irregular surface; and

FIG. 15 illustrates a sheet of the invention equipped with tabs cut into the adhesive-covered area of the sheet.

DESCRIPTION OF THE ILLUSTRATED EMBODIMENTS

Figure 2:
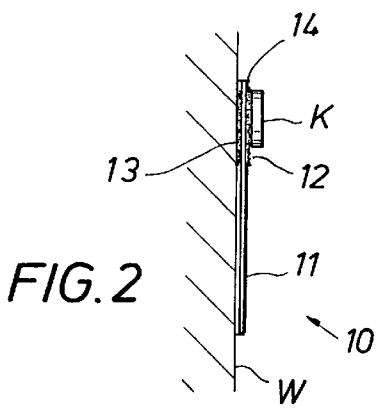
FIG. 2 is a cross-sectional view taken along the line 2—2 of FIG. 1.
Figure 1:
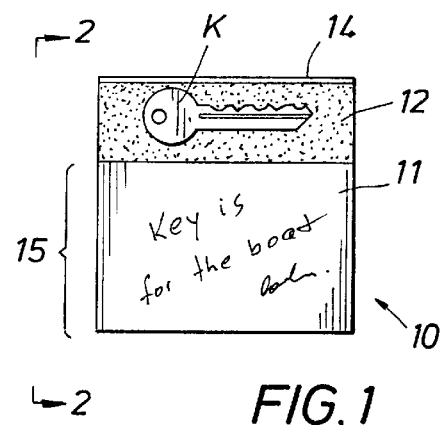
FIG. 1 is an elevation illustrating a sheet of note paper of the present invention employed to secure a small object to a wall.

The note sheet of the present invention is indicated generally at 10 in FIG. 1. The note sheet comprises a sheet body 11 of paper or other suitable material having a pressure-sensitive adhesive material 12 applied to the front surface of the sheet. An object such as a key K is illustrated adhered to the adhesive material 12. Referring jointly to FIGS. 1 and 2, one may see that the sheet 11 is provided with adhesive material 13 on its back surface opposite the adhesive material 12. The adhesive materials 12 and 13 are applied in the area adjacent an upper side edge 14 of the sheet 11. In the illustration of FIG. 2, the adhesive material 13 is used to secure the sheet 11 to a posting area such as a wall W. The lower portion of the sheet 11 is free of adhesive material to provide a message area 15 on the sheet face.

Figure 3:
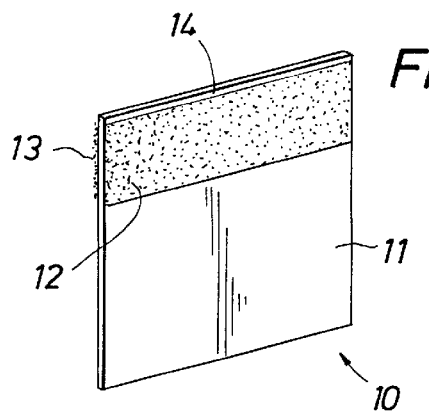
FIG. 3 is an elevation, in perspective, illustrating a note sheet of the present invention having adhesive applied to the front and back of the sheet.

FIG. 3 illustrates the sheet 11 as it appears before being posted or adhered to an object. While only a small percentage of each surface of the sheet 11 is illustrated as carrying adhesive material, it will be understood that increased areas of adhesive material may be employed for holding larger or heavier objects. In a preferred form, for use with heavier objects, 20% or more of each side of the sheet may carry adhesive material.

Figure 4:
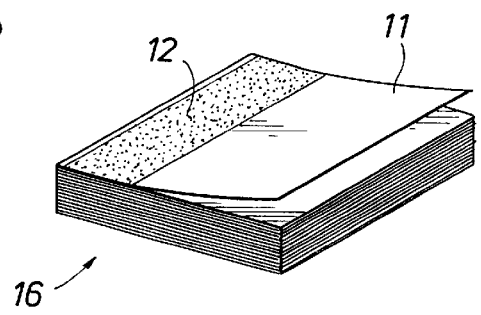
FIG. 4 is a perspective view of a pad of sheets made in accordance with the teachings of the present invention.

A rectangular solid pad indicated generally at 16 in FIG. 4 is formed by a number of individual sheets 11 adhered to each other. The individual sheets are held together in pad form by the adhesive material 12 and 13 provided on each sheet of the pad.

Figure 5:
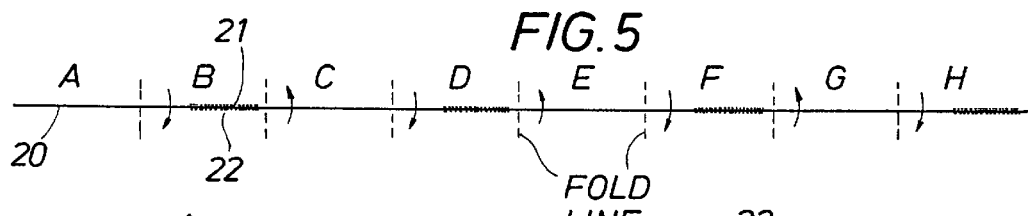
FIG. 5 is a schematic drawing illustrating a strip of paper used in a method of fabricating the paper sheets employed in one form of the present invention.
Figure 6:
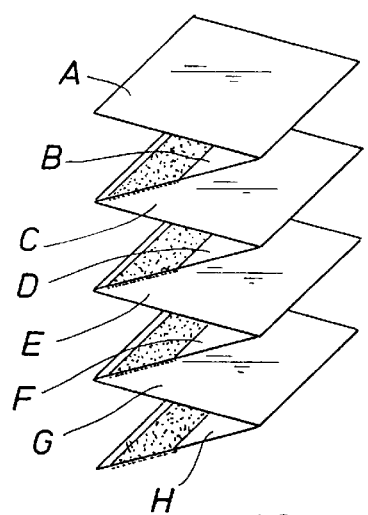
FIG. 6 is a schematic representation of the strip of paper illustrated in FIG. 5, folded accordion-style before being compressed into a pad form.

A method for fabricating one form of the note sheets of the present invention is partially illustrated in FIG. 5. A continuous strip of paper 20 is provided with a pressure-sensitive adhesive 21 and 22 on opposite sides of the strip. The adhesive is positioned at defined, spaced locations along the length of the strip as indicated in FIG. 5. Once the adhesive has been applied to the strip 20, the strip is folded between each section A–H along the indicated fold lines and in the direction of the arrows associated respectively with each section A–H. The result is an accordion-like fold illustrated in FIG. 6.

Figure 7:
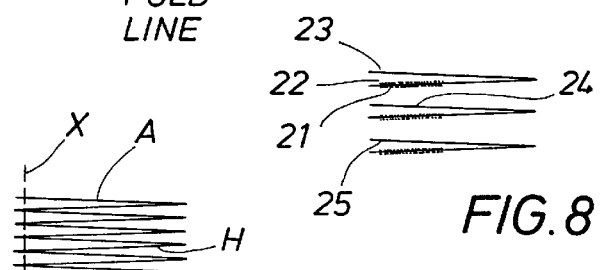
FIG. 7 schematically illustrates a pad of the folded paper strip of FIG. 6 with a cut line indicated along one fold end of the pad.
Figure 8:
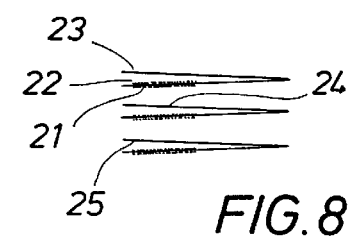
FIG. 8 schematically illustrates the formation of multiple individual sheets of note paper formed after a fold end of the pad is cut away.

The folded strip 20 is compressed into a rectangular solid pad configuration and the fold edge nearest the adhesive areas of the pad is cut or shaved away, as indicated by the cut line X illustrated in FIG. 7. With reference to FIG. 8, the result of cutting the edge of the pad is a number of individual sheets 23, 24, and 25, made respectively by the sections AB, CD, and EF. The adhesive 21 is applied so that it is slightly back from the edge of the section B to leave an adhesive-free edge area that permits the sheet section A to be grasped and pulled away from the section B to open the two sections into a single-ply sheet. Each of the sheets in the pad is similarly constructed.

Figure 9:
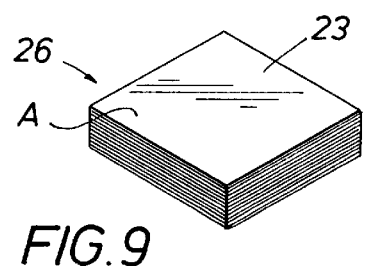
FIG. 9 is a perspective view illustrating a pad of note paper sheets formed in accordance with the teachings of the present invention.

As illustrated in FIG. 8, each sheet includes adhesive material on opposite sides of a portion of the sheet, with the adhesive in each sheet of the pad of sheets being adjacent a common edge of the pad. The adhesive 21 and 22 on each of the individual sheets secures each sheet to the adjoining sheet to form a rectangular solid pad 26, as illustrated in FIG. 9. The top surface area A of the pad 26 carries no exposed adhesive. This feature prevents extraneous materials from adhering to the pad.

Sheets of the type illustrated in FIGS. 8 and 9 may be employed as described with reference to the sheet 11 illustrated in FIGS. 1–4. In addition, rather than being used to hold an object to a posting surface, the sheet, such as the sheet 23, may be employed to post a concealed message. In this application, the bottom section of the note sheet is folded over the message and adhered to the adhesive at the top front of the sheet to keep the message covered until the note sheet is unfolded. Thus, with reference to the sheet 23 of FIG. 8, the adhesive 21 may be used to adhere the sheet to a posting surface, and a message may be written in the message area adjacent the adhesive 22. The section A may then be folded up over the Section B to engage the adhesive 22, which covers the message and the adhesive 22. This prevents the message from being viewed without first unfolding the section A from the section B and also prevents extraneous material from adhering to the adhesive 22. When the sheet 23 is intended only as a marker or message conveyance and is attached to a file or other portable object, folding the sheet 23 back upon itself serves the additional function of preventing materials from sticking to the exposed adhesive 22.

The double-sided adhesive sheet and pad illustrated in FIGS. 3 and 4 may also be fabricated by folding the strip 20 so that the adhesive-bearing areas 21 and 22 are positioned at the mid-point of alternating folds, with adhesive-free areas on either side of the adhesive areas of a fold and no adhesive on alternating folds as indicated in FIG. 10. The resulting pad may then be cut through its center along the cut line X to divide the pad into two equal sized rectangular solid pads that each carry adhesive along the sheet area adjacent the cut.

A modified form of the invention is illustrated in FIGS. 11 and 12 for use when one of the objects to which the paper sheet is to be secured has an irregular surface. The note sheet of the modified embodiment is indicated generally at 30 in FIG. 11. The sheet 30 includes a flat, planar body 31 provided with adhesive material 32 along its upper rear surface. The lower portion of the sheet body is cut with a series of lengthwise cuts 33 that extend through adhesive material 34 applied to the lower front surface of the sheet body 31 to form paper segments or strips 35.

As best described with reference to FIG. 12, the note sheet 30 is applied to an irregular surface S by placing the adhesive material 34 against the surface S and applying pressing forces against the opposite side of the strips 35. The cuts 33 permit the strips 35 of paper to be independently moved laterally relative to the plane of the sheet body 31 to better conform to the irregular surfaces. A smoother surface object, such as a microcassette M, may be attached to the adhesive 32 on the face of the sheet body 31.

FIG. 11 illustrates the use of the sheet 31 to secure an object R having an irregular, or non-smooth, surface to a smoother object T. The adhesive material 32 on the sheet 31 secures the sheet to the object T as previously described.

Another modified form of the sheet of the present invention is illustrated generally at 40 in FIG. 13 of the drawings. The note sheet 40 is formed by a planar sheet body 41 of paper having adhesive 42 applied along a surface area 43. The paper in the surface area 43 is cut by a series of cuts 44 that form multiple finger segments or strips 45. Unlike the cuts of the embodiment of FIGS. 11 and 12, the cuts 44 extend to the edge of the sheet 41 so that the ends of the finger strips 45 are free to move away from the plane of one sheet body, as well as from adjoining strips. An uncut, adhesive-free area 46 is provided adjacent the adhesive-covered area 43 to receive a marking or message. Where only one side of the sheet 41 is provided with adhesive, the message surface is preferably formed on the side of the sheet having no adhesive.

FIG. 14 illustrates the sheet 41 adhered to an irregular surface S. In use, the adhesive-covered areas of the individual finger strips 45 are pressed against the surface S. The finger strips are free to follow the contour of the irregular surface without distorting the message area 46. The free movement of the strips 45 also increases the amount of surface contact between the adhesive-covered area of the sheet 41 and the irregular surface S to increase the holding force between the sheet and the surface S. As with the previously described embodiments, multiple sheets 41 may be assembled in pad form.

It will also be appreciated that the form of the sheet illustrated in FIGS. 11 and 12 may be provided with cuts 33 that extend through the edge of the sheet to make finger strips such as those illustrated in the embodiment of FIGS. 13 and 14. Similarly, the sheet 30 of the embodiment of FIGS. 11 and 12 may be provided with adhesive only in the slotted or cut area and only on one side of the sheet. Such a configuration would be employed for posting a message (without an object attachment) on an irregular surface.

FIG. 15 of the drawings illustrates a sheet 51 having segments or tabs 52 and 53 cut into an adhesive-covered area 54. The tip ends of the sharp tip tabs 52 and rounded tip tabs 53 are free to move away from the plane of the sheet 51 to adhere to an irregular surface without distorting an adhesive-free message area 55 provided at the bottom of the sheet. The rear side of the sheet 51 may be, or may not be, provided with an adhesive-covered area.

The adhesive material used for the sheets described in the present invention may be any suitable semi-sticky, pressure-sensitive adhesive material that can be used to temporarily join two surfaces together. By way of example rather than limitation, the adhesive may be an acrylate copolymer microsphere structured adhesive, as described in U.S. Pat. No. 3,691,140. The degree of adhesion of the adhesive material within the area of adhesive application on the sheet may also be controlled as desired, for example, to better control or regulate the removal of sheets from a pad or to better control the self-retention strength of the pad structure. Such adhesives and adhesive application techniques are well known. While the preferred material for the note sheets of the present invention has been described as paper, it will be understood that other materials, such as plastic and other synthetic material, may be employed without departing from the spirit and scope of the present invention. The two major surfaces of the sheets of the present invention may be any desired size, such as 2 inches by 3 inches, 3 inches by 1½ inches, 8 inches by 11 inches, or any other desired size. The thickness of the sheets may be similar to that of standard letter paper or may be any other suitable thickness. It will also be understood that the sheets may take on any desired polyhedron shape or other form, including circular, oval, and other arcuate shapes. Similarly, the segments such as the strips and tabs cut into the sheets may take on a variety of different shapes as desired.

Accordingly, it will be appreciated that while preferred forms of the note pad and method of the present invention have been described herein in detail, various changes in the size, shape, form, methods of construction, and use of the invention may be made without departing from the spirit and scope of the invention, which are more fully defined in the following claims.

What is claimed is:

1. A pad comprising multiple note sheets secured together as a superimposed stack to from said pad, one or more of said note sheets each comprising:

a sheet of material having a front and rear surface and a side edge;

a pressure-sensitive adhesive carried on a first surface area on said front surface for adhering said sheet to a first object;

a pressure sensitive adhesive carried on a second surface area covering a portion of said rear surface for adhering a second object to said sheet; and a markable, adhesive free area on said rear surface for receiving markings, said sheet being folded upon itself to cover said first adhesive-carrying area whereby an adhesive-free rear surface of the top sheet in said pad comprises the top surface of said pad.

2. The note sheet as defined in claim 1 wherein at least one of said first and second adhesive-carrying areas is at least partially traversed by cuts in said sheet of material for increasing the adhesion of said cut area an object having an irregular surface.

3. The note sheet as defined in claim 2 wherein said cuts extend through an edge of said sheet to form multiple adhesive-carrying strips for adhering said note sheet to an irregular surface.

4. The note pad as defined in claim 2 wherein said first and second surface areas each respectively comprise at least 20% of the area of said front and rear surfaces of said sheet.

5. The note pad as defined in claim 3 wherein said first and second surface areas each respectively comprise at least 20% of the area of said front and rear surfaces of said sheet.

6. A pad of note sheets adhered to each other as a superimposed stack, said sheets being for attachment to an object, one or more note sheets of said pad each comprising:

- a sheet of material having front and rear substantially planar surfaces and a side edge between said front and rear surfaces;
- a pressure-sensitive adhesive carried on a first area on said rear surface of said sheet for adhering said sheet to a first object; and
- cuts extending through said sheet in said first surface area for separating said sheet into segments that may independently move relative to a plane of said sheet.

7. The pad of notes sheets as defined in claim 6 wherein said cuts in one or more sheets of said pad extend through said side edge of said sheet for forming a plurality of finger strips that may move relative to a plane of said sheet.

8. The note sheet as defined in claim 6, further including a pressure-sensitive adhesive carried on a second surface area on said front side of said sheet.

9. The note sheet as defined in claim 8, further including a markable, adhesive-free area on at least one of said front and rear surfaces for receiving markings.

* * * * *

UNITED STATES PATENT AND TRADEMARK OFFICE
CERTIFICATE OF CORRECTION

PATENT NO. : 5,965,225
DATED : October 12, 1999
INVENTOR(S) : Carlos A. Torres

It is certified that error appears in the above-identified patent and that said Letters Patent is hereby corrected as shown below:

In column 6, line 43, delete "from" and insert therefor --form--.

In column 7, line 4, delete "3" and insert therefor --1--.

Signed and Sealed this

Eleventh Day of April, 2000

Attest:

Attesting Officer

Q. TODD DICKINSON
Director of Patents and Trademarks